US012572345B2

(12) United States Patent
Habiba et al.

(10) Patent No.: US 12,572,345 B2
(45) Date of Patent: Mar. 10, 2026

(54) GENERATING A TEMPLATE IN A SOFTWARE ENVIRONMENT

(71) Applicant: International Business Machines Corporation, Armonk, NY (US)

(72) Inventors: Mansura Habiba, Jhonstown (IE); Shyamal Kuhar Saha, London (GB); Utz Bacher, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 18/364,695

(22) Filed: Aug. 3, 2023

(65) Prior Publication Data

US 2025/0013449 A1     Jan. 9, 2025

(30) Foreign Application Priority Data

Jul. 4, 2023     (GB) ...................................... 2310251

(51) Int. Cl.

| | |
|---|---|
| *G06F 9/44* | (2018.01) |
| *G06F 8/20* | (2018.01) |
| *G06F 8/60* | (2018.01) |
| *G06F 8/61* | (2018.01) |
| *G06F 9/45* | (2006.01) |
| *G06F 9/50* | (2006.01) |
| *H04L 69/00* | (2022.01) |

(52) U.S. Cl.
CPC ...................................... *G06F 8/61* (2013.01)

(58) Field of Classification Search
CPC .......... G06F 8/61; G06F 8/60; G06F 9/45558; G06F 8/65; G06F 9/5055; G06F 8/36; G06F 9/455; G06F 9/543; G06F 9/50; G06F 8/71; H04L 41/5096; H04L 41/0843; H04L 41/5048; H04L 41/5054; H04L 67/34; H04L 69/26; H04L 69/161; G06Q 50/188; G06Q 10/06; G06Q 10/0633

See application file for complete search history.

(56) References Cited

U.S. PATENT DOCUMENTS

| | | | | |
|---|---|---|---|---|
| 10,318,265 | B1 * | 6/2019 | To ........................... | H04L 67/34 |
| 11,281,503 | B2 * | 3/2022 | Giannetti ............ | G06F 11/3006 |
| 11,416,754 | B1 | 8/2022 | Durvasula | |

(Continued)

FOREIGN PATENT DOCUMENTS

| | | |
|---|---|---|
| CN | 114089962 A | 2/2022 |
| GB | 2631508 A | 1/2025 |

OTHER PUBLICATIONS

Oracle Endeca Deployment Template Usage Guide, Oracle, 144 pages (Year: 2012).*

(Continued)

*Primary Examiner* — Thuy Dao
(74) *Attorney, Agent, or Firm* — Andre L. Adkins

(57) ABSTRACT

A computer-implemented method, program product, and systems for deploying an application in a software environment is provided. Embodiments of the present invention can analyze an input to extract at least one keyword and generate a list of at least one service for the input based on at least one keyword. Embodiments of the present invention can generate a template to satisfy the input request using the list of at least one service and deploy the application by applying the template.

18 Claims, 5 Drawing Sheets

(56) References Cited

U.S. PATENT DOCUMENTS

| | | | | |
|---|---|---|---|---|
| 11,714,621 | B2 * | 8/2023 | Govindaraju | G06F 9/5072 |
| | | | | 717/176 |
| 2019/0146810 | A1 * | 5/2019 | Ganesh | H04L 43/0888 |
| | | | | 718/1 |
| 2020/0159552 | A1 | 5/2020 | Bodin | |
| 2020/0326990 | A1 | 10/2020 | Staffelbach | |
| 2021/0142186 | A1 | 5/2021 | Zhao | |
| 2021/0255842 | A1 | 8/2021 | Levitt et al. | |
| 2023/0262135 | A1 * | 8/2023 | Tian | H04L 41/5048 |
| | | | | 709/203 |
| 2024/0078172 | A1 * | 3/2024 | Duggal | G06F 11/3696 |
| 2024/0137411 | A1 * | 4/2024 | Hu | H04L 41/16 |

OTHER PUBLICATIONS

Anonymous, "Ansible Lightspeed", RedHat, downloaded from the internet on Jul. 26, 2023, <https://www.redhat.com/en/engage/ansible-lightspeed>, 5 pages.
Anonymous, "How to Create an App", Google AppSheet, downloaded from the internet on Jul. 26, 2023, <https://about.appsheet.com/how-to-create-an-app/>, 15 pages.
AWS Online Tech Talks, "Infrastructure as Code on AWS—AWS Online Tech Talks", YouTube, Apr. 20, 2020, <https://www.youtube.com/watch?v=cKQtPZwf97s>, 4 pages.
Red Hat Ansible Lightspeed with IBM Watsonx Code Assistant, Retrieved from: https://web.archive.org/web/20231026233406/https://www.redhat.com/en/technologies/management/ansible/ansible-lightspeed, Oct. 26, 2023, 7 pages.
UK Intellectual Property Office, "Search Report", Dec. 11, 2023, 6 p. GB Application No. 2310251.0.

* cited by examiner

100

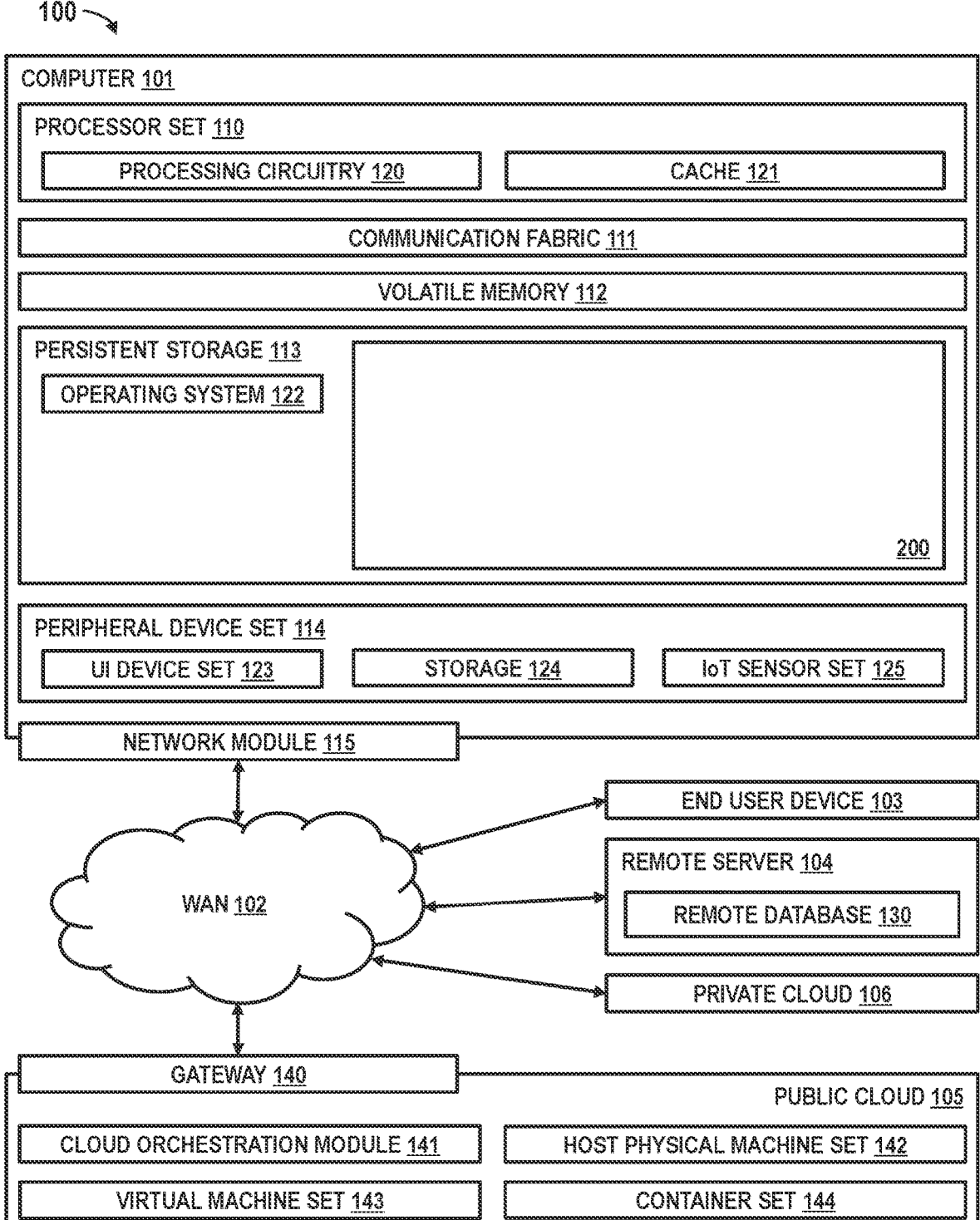

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

200

PERIPHERAL DEVICE SET 114

UI DEVICE SET 123

STORAGE 124

IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

Input

202

Extract at least one keyword

204

Generate at least one required service

206

Is there an existing template for the at least one required service?

Yes

208

Deploy the existing template

No

210

Generate a new template

212

Deploy the new template

400

Generate template

412

An alternative list of at least one required service

402

Deploying template in a test environment

404

Running the application with sample data

406

Analyzing the application to measure service level indicators

408

Are the SLIs of the application above a validation threshold?

No

Yes

410

Deploying template to the production environment

GENERATING A TEMPLATE IN A SOFTWARE ENVIRONMENT

BACKGROUND

The present invention relates to generating a template capable of running in a software environment.

Examples of such a software environment include no-code development platforms (NCDP) and low-code development platforms (LCDP). NCDP and LCDPs can expedite a software development process by facilitating the development and deployment of software applications without traditional coding methods. NCDP and LCDPs use graphical user interfaces (GUI) to allow a user to configure parameters and data through the platform. The configured parameters and data are then used to create and deploy software applications.

NCDP and LCDPs s are used for various software processes and industries such as for mobile application development, website application development and database management software management. NCDPs are also used in cloud computing, wherein technologies such as microservices and re-usable code components are leveraged to create and deploy software applications on the cloud.

For example, a user can use the GUI of a website building NCDP or LCDP to choose their website theme, put in text and images relating to their products, put in their banking payment details and create a shopping web application, without writing any code themselves. The NCDP or LCDP selects the user's preferences and inputs to automatically select the relevant services needed for the web application, such as a web hosting service, a payment service and an authentication service.

Some conventional NCDP and LCDPs can provide recommendations of services to the user. Such software environments can analyze a set of data and recommend a single application program interface (API) based on the features of the data. For example, if the data is a .csv file with the features: date, address, longitude and latitude, the software environment can recommend a Map API to be used in the application.

Conventional NCDP and LCDPs cannot analyze a more complex input, such as a business statement presented as a string of text, or an audio file of a meeting describing the application to be developed and convert it into an end-to-end software application. This is because the complex input requires multiple Application Programing Interfaces (APIs) or services that are outside a pre-determined template.

Infrastructure as Code (IaC) is a process of managing IT infrastructure, by codifying the requirements and connections. IaC can be used to provide the software infrastructure to manage and provision a NCDP or LCDP environment. IaC can also be used to provide the software infrastructure to manage provision and host a software application resulting from the NCDP or LCDP. An application can be codified into a template which describes where the application is deployed, which software service it requires, how much computing power is required, how the network is secured and other considerations.

IaC use templates which allows applications to be deployed and scaled rapidly. A template is a machine-readable definition file, that describes how the different components and services of a software environment are configured and deployed. The use of templates also allows infrastructure environments and services to be repeatable, since the template can be used to deploy an identical environment.

Conventional IaC systems cannot create templates without manual human input and knowledge. A software developer or engineer familiar with templates and the software environment can create a template; it is difficult for a non-technical user to create a template, let alone deploy an end-to-end application without specialized knowledge.

Large Language Models with additional training on IaC code can have issues with correctness and complexity of tasks, as well as the contextualization of requirements and code.

SUMMARY

According to an aspect of the present invention, there is provided a method comprising: analyzing an input request to extract at least one keyword; generating a list of at least one service for the input request, based on the at least one keyword; generating a template to satisfy the input request, using the generated list of at least one required service; and deploying an application in a software environment by applying the template.

According to another aspect of the present invention, there is provided a system comprising: an input component, operable for analyzing an input request to extract at least one keyword; a classification component, operable for generating a list of at least one service for the input request, based on the at least one keyword; an integration engine, operable for generating a template to satisfy the input request, using the generated list of at least one required service; and a deployment engine, operable for deploying an application by applying the generated template.

According to another aspect of the present invention, there is provided a computer program product comprising: one or more computer readable storage media, and program instructions collectively stored on the one or more computer readable storage media, the program instructions comprising: program instructions to analyze an input to extract at least one keyword; program instructions to generate a list of at least one service for the input request, based on the at least one keyword; program instructions to generate a template to satisfy the input request, using the generated list of at least one required service; and program instructions to deploy an application in a software environment by applying the generated template.

Advantageously, the method allows the generation of software applications without manual intervention. This results in more efficient creation and deployment of software applications since compared to using a user-driven GUI, the method requires less CPU resources and will result in less coding errors.

The maintenance of the resulting application can be fully automated and audited since each step of the method is codified.

In addition, a user requiring certain functional requirements can deploy an application by inputting a human-readable string. This means that the user does not need to have extensive technical skilled related to cloud computing or software engineering to create and deploy applications.

BRIEF DESCRIPTION OF THE DRAWINGS

The present invention will now be described, by way of example only, with reference to preferred embodiments, as illustrated in the following figures:

FIG. 1 is a block diagram of an example embodiment of a computing environment for the execution of at least some of the computer code involved in performing the present invention;

DETAILED DESCRIPTION

Figure 2:
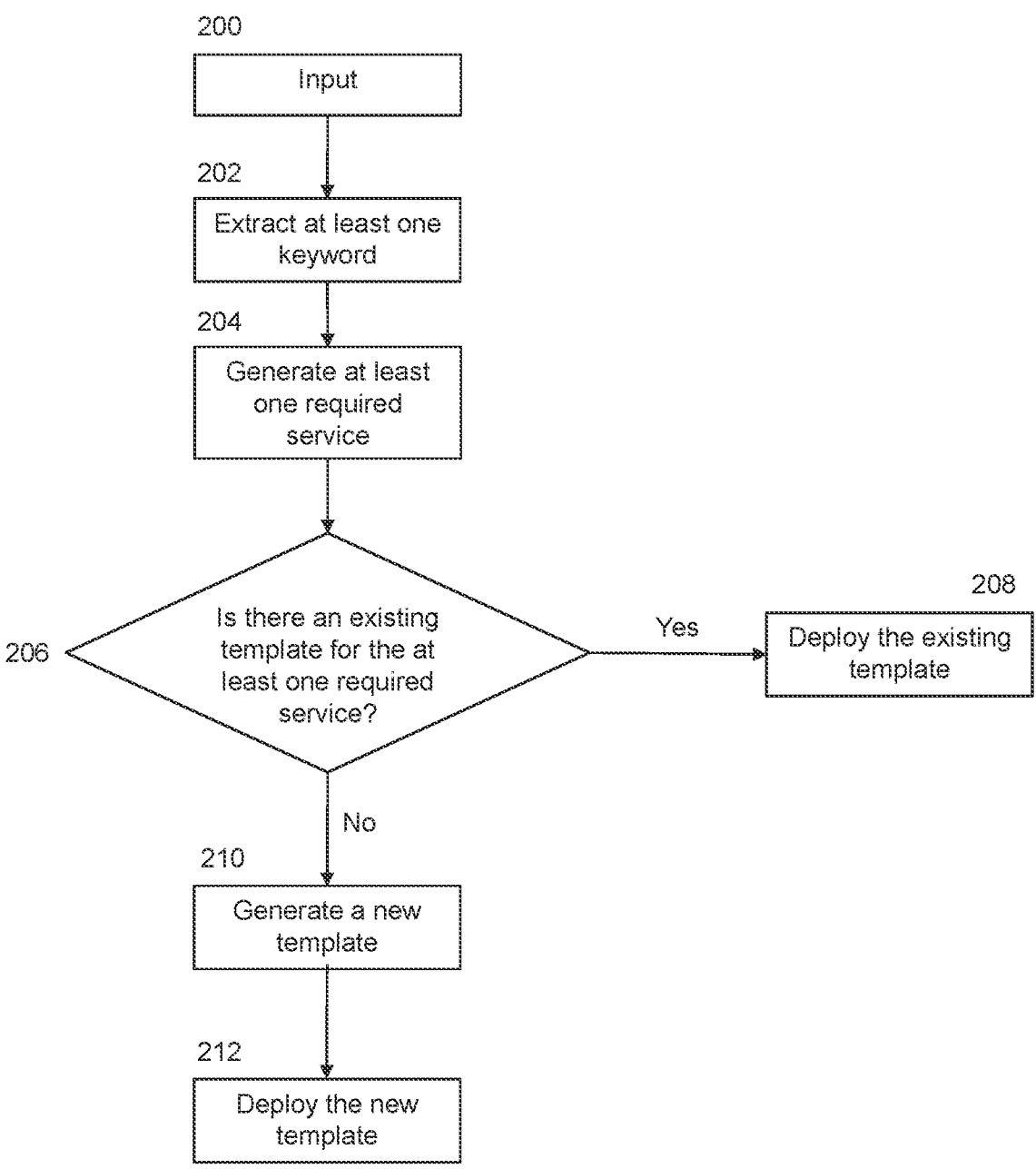
FIG. 2 shows, in accordance with a preferred embodiment of the present invention, a flow diagram of the method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as application orchestration code (i.e., application orchestration program) 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A computer-implemented method is described below which is capable of generating a template from a user input (i.e., input request) and deploying an application onto a software environment, which satisfies the user input. Examples of such a software environment include no-code development platforms (NCDP) and low-code development platforms (LCDP).

FIG. 2 shows a summary block diagram of a method for deploying an application in a software environment. A comprehensive description of how a template is generated is presented below and illustrated in FIG. 3.

Figure 5:
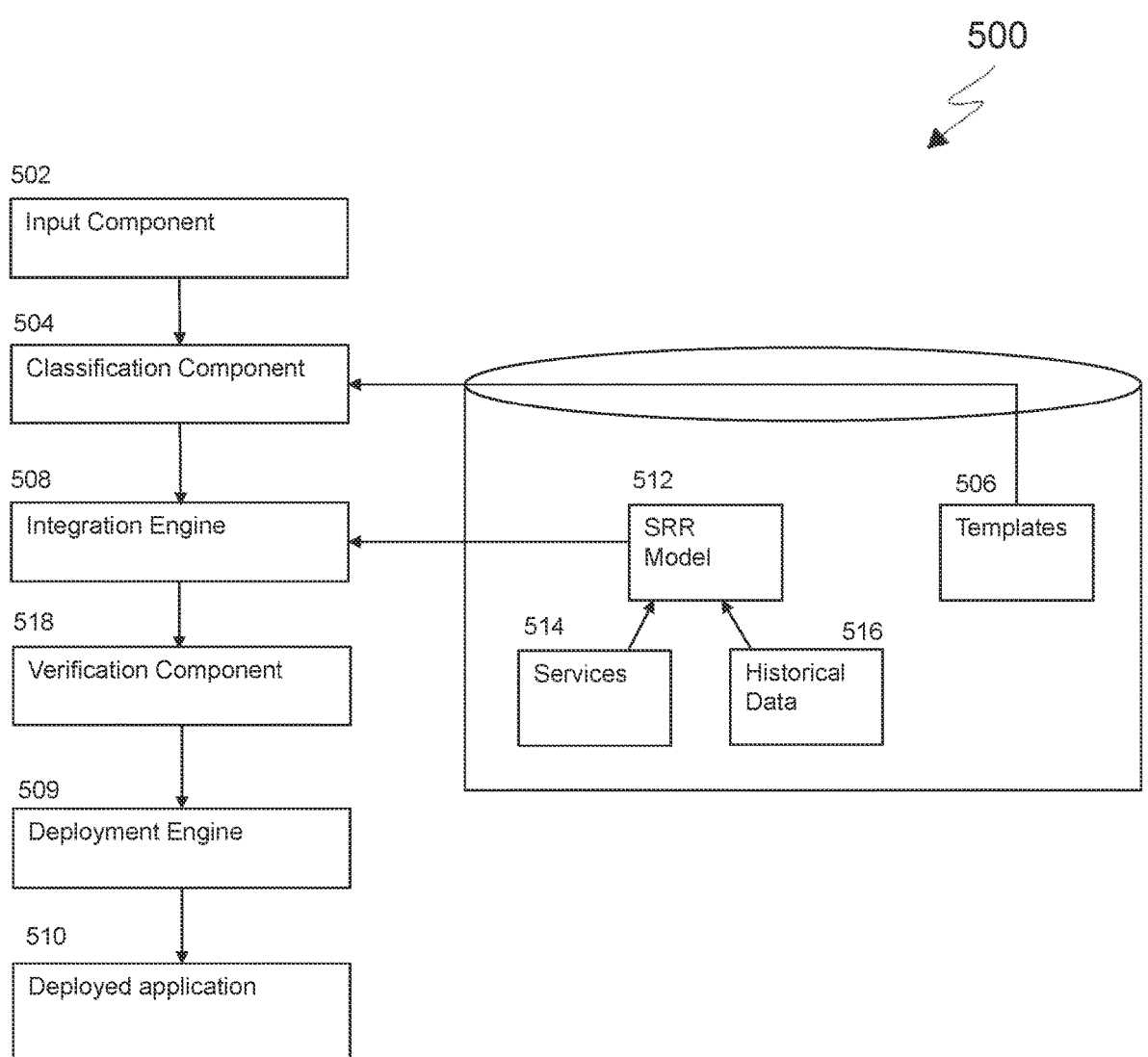
FIG. 5 is a block diagram depicting components of a system in accordance with a preferred embodiment of the present invention.

FIG. 2 should be read in conjunction with FIG. 5. FIG. 5 illustrates a block diagram 500 depicting components of a system representative of application orchestration program 200 in accordance with a preferred embodiment of the present invention.

An input (i.e., input request) is provided by a user via application orchestration program 200. The input describes the functionality that the user requires in a software application. The input is analyzed to extract at least one keyword 202 by an input component 502. Keywords indicate the functionality and capability that the user requires.

Based on the keywords extracted, a list of at least one required service for the input is generated 204 by a classification component 504. Services on a cloud computing environment include infrastructure and software that can be accessed through the internet. Databases, applications to run functional code and applications that serve a front-end to allow a user to interact with the software are all examples of services. The method analyzes the keywords and match them to required services in the software environment. A comprehensive description of how the list of services is generated is described below.

The classification component 504 checks a database of known templates 506 to check if there is a saved template that would suit the list of required services 206. If there is a saved template that is suitable, the identified saved template is used to deploy the application 208. A suitable template includes all the identified services required and includes code that codifies the connections and resources required to create the application.

If a suitable saved template is not found, a new template is generated 210 by the integration engine 508. A comprehensive description of how the new template is generated is described below.

Finally, a deployment engine 509 applies the template 212 to result in a deployed application 510. The resultant application is presented to the user.

Figure 3:
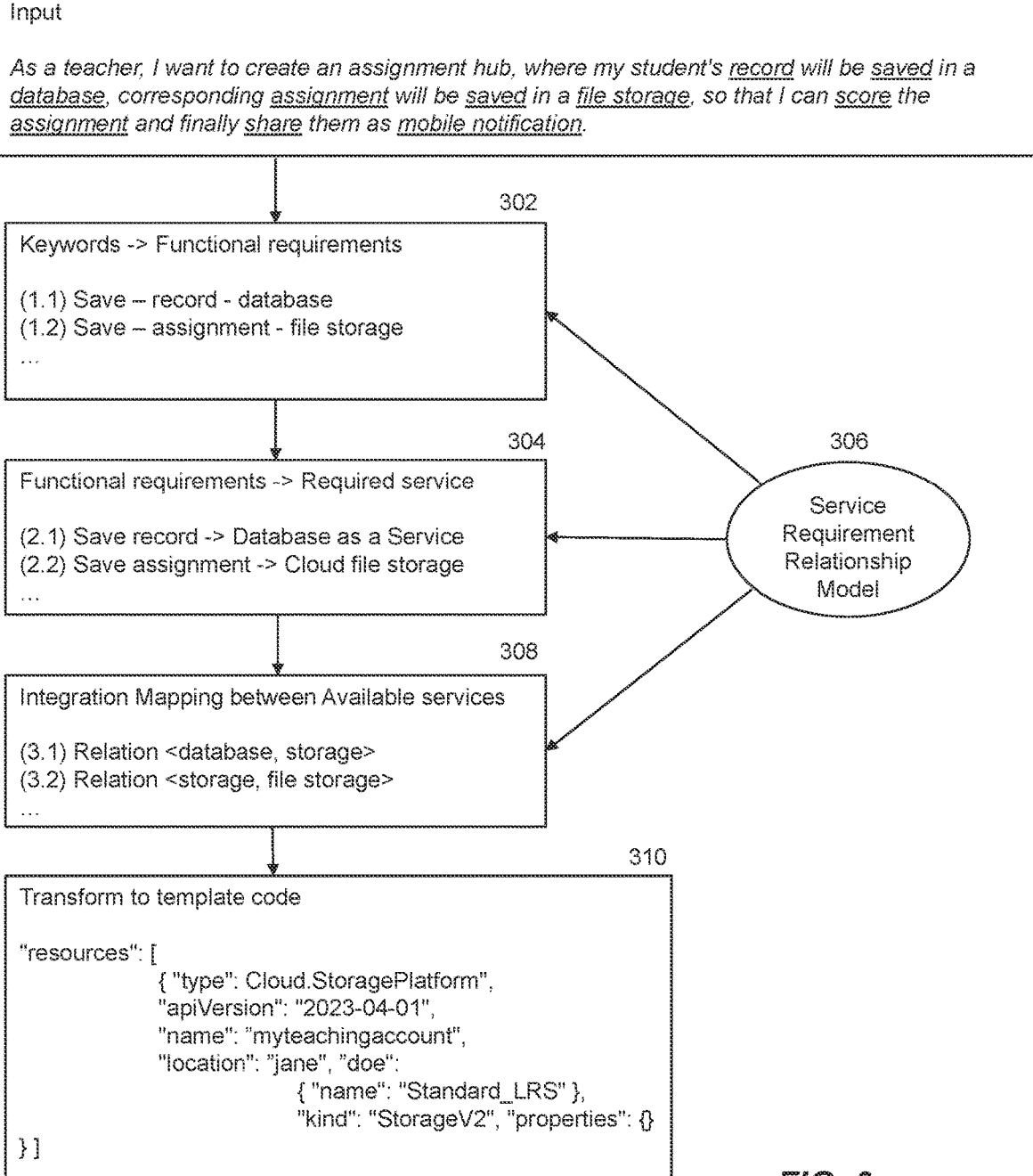
FIG. 3 shows, in accordance with a preferred embodiment of the present invention, a flow diagram of the method.

FIG. 3 is a block diagram showing a detailed flow of how the input is transformed into a template. A user submits an input 300. The input can take various forms including a text-based string input. Another form of input can be an audio file, wherein a speech-to-text method is used to parse the audio file into a text-based string. Another form of input can be a graphical input such as a flow chart or a component diagram, wherein an image-to-text component can be used to parse the graphical input into a text-based string.

As an example, during the process of designing and architecting a software project, a "hill statement" or a "user needs statement" are used to capture the essential functionalities that are required by the end user of the software application. The "hill statement" can be used as an input.

In this example, the input is a text string comprising: "As a teacher, I want to create an assignment hub, where my student's record will be saved in a database, corresponding assignment will be saved in a file storage, so that I can score the assignment and finally share them as mobile notification".

Then, the keywords are extracted from the input. The skilled person in the art will appreciate that there are existing techniques that can be used to extract keywords from an input. For example, a pre-determined list of known keywords can be compared to a text-based input. As another example, a machine learning model can be used to extract significant terms related to a particular field.

For the example input, the terms "records", "saved", "database", "assignment", "saved", "file storage", "score", "share", "notification" are identified. Then the semantic relationships between them are generated such that their functional requirements are extracted 302. The skilled person in the art will appreciate that there are various existing techniques to generate the semantic relationships between entities. For illustration purposes, the following relationships are described with the syntax [action/entity/destination]:

(1.1) Save—record—database
(1.2) Save—assignment—file storage
(1.3) Score—assignment—[graphic user interface]
(1.4) Share—assignment score—mobile notification The person skilled in the art will appreciate that additional metadata relating to the relationship can be incorporated and the relationship can be saved in different format, for example, in a coded class or object.

The user input relating to the scoring keyword (1.3) did not specify where the action is to be carried out. In this example, it is found that a scoring feature is usually carried out by the user via a graphical user interface. Therefore, (1.3) is completed by identifying that a [graphical user interface] is where the scoring is to be carried out.

Any extracted keywords for which it is not possible to identify relationships and/or associated actions can be resolved by querying a database of known keyword relationships. Alternatively, the method can complete this by querying a machine learning model that is trained on known relationships between keywords and how they are implemented in software environments (e.g., using which services).

For example, a Service Requirement Relationship (SRR) model 306 (please also see 512 of FIG. 5) can include knowledge about all available services 514 in the software environment. The SRR model can include information of how the available services are configured with respect to each other, as well as how keywords relate to functional requirements and services. The SRR model can be used to transform the keywords to a functional requirement 302, and subsequently to identify the required service that is needed in the application 304.

The SRR model can ingest historical data 516 such as log events (i.e., log event data), activity event data and system telemetry data. The model surfaces tuples between keywords and services by using machine learning methods such as conditional probability techniques, cluster analysis and swarm intelligence techniques. The person skilled in the art will appreciate that additional sources of data can be ingested by the SRR model.

Swarm intelligence uses collaborative game theory and conditional probability to converge on a solution. It is used to generate accurate forecasts for various fields such as finance and health. Agents act as a miner to search for the neighbour system and related services by deploying a "pheromone" as they walk through different services. Agents develop collective knowledge of the other agents and the relationships between them. The agents can converge on the best services that fulfil each functional requirement.

Once each keyword has associated with at least one functional requirement, the required services are identified 304. The integration engine 508 generates a list of at least one required service using SRR model 306, 512. For illustration purposes, the following list is with the syntax [functional requirement/required service/availability]:

(2.1.1) Save record—>Database as a Service [Available] (2.1.2)

(2.1.2) Save assignment—>Cloud file storage [Available] (2.1.3)

(2.1.3) Score assignment—>Analytics service, front-end client application [Available]

(2.1.4) Share assignment score—>Mobile push service [Not Available]

The method can identify services that are required to carry out the functional requirements (identified from the keywords) using the SRR model. For example, the SRR model may find that an assignment scoring functionality is usually accompanied by an analytics service. Therefore, this service is added to the list of at least one required service.

Once a list of at least one required service is generated, it is transformed into a list of at least one available service. The difference between the list of at least one required service and the at least one available service is that the latter only includes services that are available in the software environment. For example, (2.2) requires a Cloud file storage service to carry out this particular functional requirement. The method searches the catalogue of available services in the software environment to confirm that this service is available.

On the other hand, for example, (2.4) requires the application to share the assignment score via a mobile application. The method searches the catalogue of available services in the software environment to confirm that there are no services that support this function, since it does not include, for example, a mobile notification service. Therefore, this functional requirement cannot be transformed into an available service. The user can be alerted of this limitation and the resulting application will not contain the functional requirement. Alternatively, the user can add services to the software environment to carry out a functional requirement by, for example, purchasing additional service capabilities on the cloud platform being used.

The list of at least one available service only includes available services that are available in the software environment. For example, the list of available services 304 can be:

(2.2.1) Save record—>Database as a Service (2.2.2) Save assignment—>Cloud file storage (2.2.3) Score assignment—>Analytics service, front-end client application The list of at least one available service is used to create an integration mapping between each of the available services 308. This step connects the available services in a way that describe the architectural relationships between them. The integration mapping describes how the available services are to be arranged with respect to each other to result in a functional application. The integration mapping between the example list of available services can be:

Relation <database, storage>

Relation <storage, file storage>

Relation <data, score, analytics service>

Relation <data, front end application>

The example integration mapping shows that the database needs to be connected to storage, and the storage needs to be connected to file storage. The integration mapping step can include the use of probability analysis, natural language processing, swarm intelligence-based clustering, reinforcement learning and corpus linguistics techniques. The SRR model can also be used to map the relationships between the available services.

The method then transforms the integration mapping to a template 310, wherein the template codifies the integration mapping and describes how to deploy at least one service in the software environment. The person skilled in the art will appreciate that various known techniques can be used to carry out this step. This includes using a machine learning model which is trained on templates of existing software environments, or alternatively using existing no-code or low-code techniques that can generate code from structured data.

Figure 4:
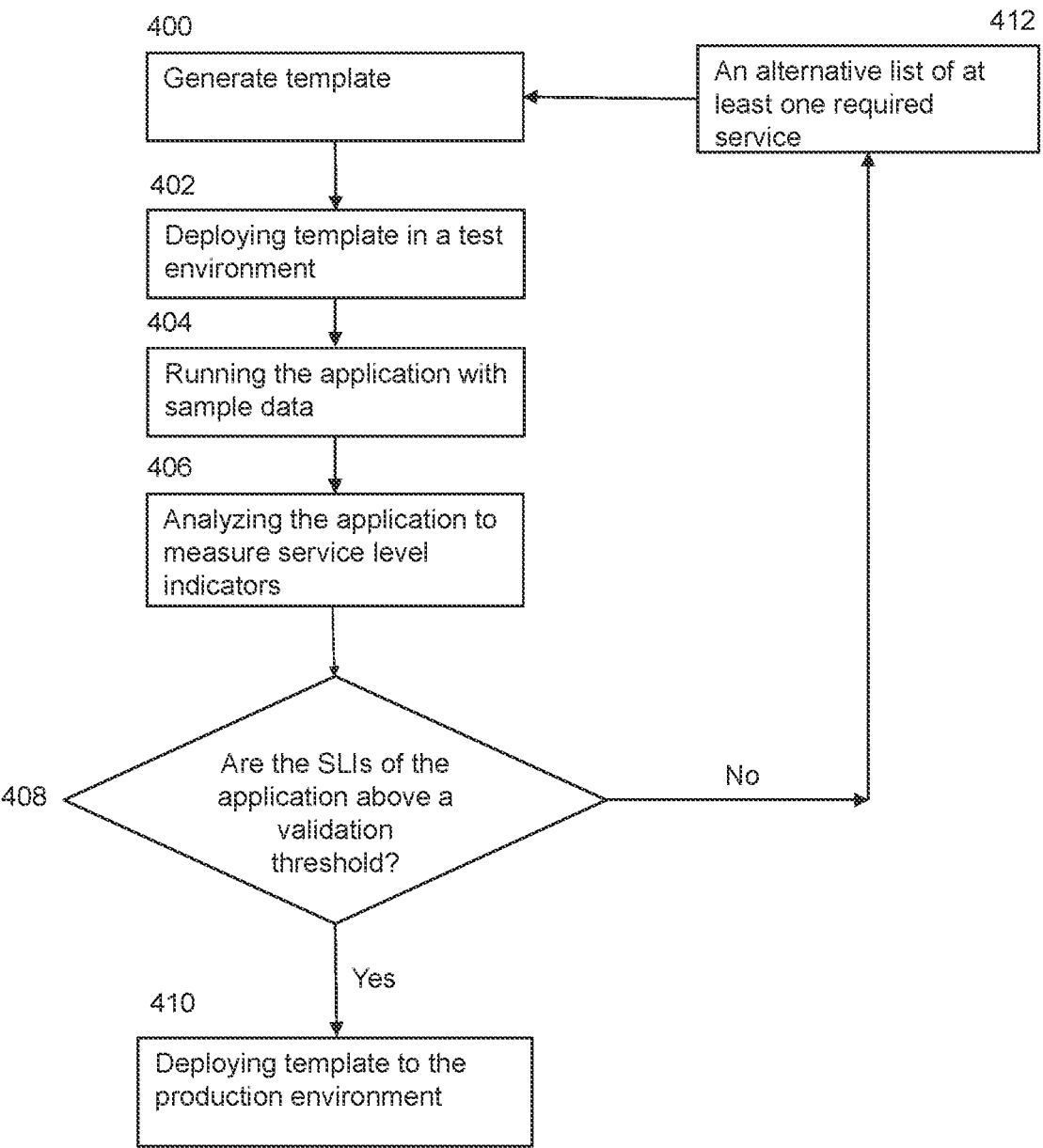
FIG. 4 in accordance with a preferred embodiment of the present invention, a flow diagram of the method.

FIG. 4 is a block diagram showing a flow of how the template is validated by a verification component 518. The validation step checks whether the resulting application from the template is stable and provides the functionality that the user requires. According to the steps described previously, a template is generated 400. The template can be validated by deploying the application, by applying the template to a test software environment 402, running the application with sample data 404 and analyzing the application to measure service level indicators (SLIs), such as latency, throughput, security and performance 406. SLIs measure the quality of service provided by the application to an end user.

If the SLIs are above a pre-determined validation threshold 408, the template is deployed to the production environment 410. Alternatively, if the SLIs are not above a pre-determined validation threshold, an alternative template is generated based on alternative services available in the software environment 412. For example, if an original database service that was selected is not good enough, an alternative database service which is available in the software environment is selected instead. The validation loop is repeated until a resulting application results in SLIs that are above the pre-determined threshold.

In addition, the validation loop can include presenting the application and the template to a user, requesting manual feedback from the user and amending the template based on the manual feedback.

A validated template can be saved into the database of known templates. The SRR model is updated to include the validated template. In this way, the validated template can be re-used for another application that requires similar functionalities.

The method can also be applied to cloud environments when a part or the whole of their application fails. By having an "input" 300 that defines the essential functionalities of an application, the method can select other available services when one of the services of the application fails. A new template can be generated from the input or an existing template, suitable for the input, can be used to re-deploy the application.

The method can also be applied to cloud environments that are migrating to a different platform with different services. Different platform providers offer services that may provide similar functionality but are not exactly the same. The method will be able to create and deploy application from an "input" and create a template by selecting services that are available in the new environment.

What is claimed is:

1. A computer-implemented method comprising:
analyzing an input request to extract at least one keyword;
generating a list of at least one service for the input request based on the at least one keyword;
generating a template to satisfy the input request using the generated list of at least one service;
wherein generating the template comprises creating an integration mapping between the at least one available service based on a relationship model and transforming the integration mapping to the template, wherein the template codifies the integration mapping and describes how to deploy the at least one available service of the generated list in a software environment; and
deploying an application in the software environment by applying the generated template.

2. The computer-implemented method of claim 1, wherein generating the list of the at least one service further comprises:
associating the at least one keyword with at least one functional requirement.

3. The computer-implemented method of claim 2, wherein generating the list of at least one service further comprises:
identifying the at least one available service available in the software environment which satisfies the at least one functional requirement.

4. The computer-implemented method of claim 3, generating the template further comprises:
generating the relationship model between the at least one available service, wherein the relationship model includes information of how the available services are configured with respect to each other.

5. The computer-implemented method of claim 4, wherein generating the relationship model comprises:
analyzing log event data, activity event data, and system telemetry data relating to the at least one available service.

6. The computer-implemented method of claim 1, wherein creating the integration mapping further comprises using at least one of:
probability analysis, natural language processing, swarm intelligence-based clustering, reinforcement learning and corpus linguistics techniques.

7. The computer-implemented method of claim 1, further comprising validating the template by:
deploying the application by applying the template to the software environment;
running the application with sample data; and
analyzing the application to measure one or more service level indicators (SLIs).

8. The computer-implemented method of claim 7, further comprising:
if the SLIs are not above a pre-determined validation threshold, generating an alternative template based on alternative services available in the software environment.

9. The computer-implemented method of claim 7, further comprising:
presenting the application and the template to a user;
requesting manual feedback from the user; and
amending the template based on the manual feedback.

10. The computer-implemented method of claim 1, wherein the software environment is a no-code development platform or a low-code development platform.

11. A system comprising:
a processor operatively coupled to memory; and
a platform in communication with the processor and the memory, the platform comprising:
an input component, operable for analyzing an input request to extract at least one keyword;
a classification component, operable for generating a list of the at least one service for the input, based on the at least one keyword;
an integration engine, operable for generating a template to satisfy the input request, using the generated list of at least one required service;
wherein generating the template comprises creating an integration mapping between at least one available service based on a relationship model and transforming the integration mapping to the template, wherein the template codifies the integration mapping and describes how to deploy the at least one available service of the generated list in a software environment; and
a deployment engine, operable for deploying the application in the software environment by applying the template.

12. The system of claim 11, wherein generating the list of the at least one service further comprises:
associating at least one keyword with at least one functional requirement.

13. The system of claim 12, wherein generating the list of at least one service further comprises:

identifying the at least one available service available in the software environment which satisfies the at least one functional requirement.

14. The system of claim 12, generating the template further comprises:

generating the relationship model between the at least one available service, wherein the relationship model includes information of how the available services are configured with respect to each other.

15. The system of claim 14, wherein generating the relationship model comprises:

analyzing log event data, activity event data, and system telemetry data relating to the at least one available service.

16. The system of claim 12, wherein creating an integration mapping further comprises using at least one of:

probability analysis, natural language processing, swarm intelligence-based clustering, reinforcement learning and corpus linguistics techniques.

17. The system of claim 11, further comprising validating the template by:

deploying the application by applying the template to the software environment;

running the application with sample data; and analyzing the application to measure service level indicators (SLIs).

18. A computer program product comprising:

one or more computer readable storage media, and program instructions collectively stored on the one or more computer readable storage media, the program instructions comprising:

program instructions to analyze an input to extract at least one keyword;

program instructions to generate a list of at least one service for the input request, based on the at least one keyword;

program instructions to generate a template to satisfy the input request, using the generated list of at least one required service;

wherein program instructions to generate the template comprises creating an integration mapping between at least one available service based on a relationship model and program instructions to transform the integration mapping to the template, wherein the template codifies the integration mapping and describes how to deploy the at least one available service of the generated list in a software environment; and program instructions to deploy an application in the software environment by applying the generated template.

* * * * *